United States Patent
Eymard et al.

(10) Patent No.: US 12,191,805 B2
(45) Date of Patent: Jan. 7, 2025

(54) METHOD FOR ELECTRICALLY CHARACTERISING A CUT PHOTOVOLTAIC CELL

(71) Applicant: COMMISSARIAT A L'ENERGIE ATOMIQUE ET AUX ENERGIES ALTERNATIVES, Paris (FR)

(72) Inventors: Julien Eymard, Grenoble (FR); Felix Gerenton, Grenoble (FR); Samuel Harrison, Grenoble (FR); Maria-Delfina Munoz, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 351 days.

(21) Appl. No.: 17/620,504

(22) PCT Filed: Jun. 9, 2020

(86) PCT No.: PCT/FR2020/050978
§ 371 (c)(1),
(2) Date: Dec. 17, 2021

(87) PCT Pub. No.: WO2020/254742
PCT Pub. Date: Dec. 24, 2020

(65) Prior Publication Data
US 2022/0360215 A1     Nov. 10, 2022

(30) Foreign Application Priority Data
Jun. 20, 2019 (FR) .................................. 1906688

(51) Int. Cl.
*H02S 50/10* (2014.01)
(52) U.S. Cl.
CPC ................... *H02S 50/10* (2014.12)

(58) Field of Classification Search
CPC ....... H02S 50/10; Y02E 10/50; G01R 31/378; G01R 31/3842; G01R 31/392
See application file for complete search history.

(56) References Cited

U.S. PATENT DOCUMENTS

| 6,844,739 B2 * | 1/2005 | Kasai ........................ H02J 7/35 323/284 |
| 2011/0025130 A1 * | 2/2011 | Hadar ............... H01L 31/02021 136/244 |

(Continued)

FOREIGN PATENT DOCUMENTS

| WO | WO 2013/179898 A1 | 12/2013 |
| WO | WO-2016108079 A1 * | 7/2016 ....... H01L 31/03926 |

OTHER PUBLICATIONS

International Search Report issued on Oct. 26, 2020 in PCT/FR2020/050978 filed on Jun. 9, 2020, 2 pages.

(Continued)

Primary Examiner — Giovanni Astacio-Oquendo
Assistant Examiner — Haidong Zhang
(74) Attorney, Agent, or Firm — Oblon, McClelland, Maier & Neustadt, L.L.P.

(57) ABSTRACT

A method for electrically characterising a cut photovoltaic cell, includes measuring the feature I-V of the uncut cell; cutting the cell into a plurality of sub-cells; measuring the feature I-V of each sub-cell not electrically connected to the other sub-cells; measuring the feature I-V of a set comprising all the sub-cells connected in parallel; determining, on the basis of the measured features I-V, performance parameters of the uncut cell, of each sub-set and of the set; computing, for each sub-cell, the difference between the value of the performance parameters of the sub-cell and that of the performance parameter of the uncut cell; and computing the difference between the value of the performance (Continued)

parameter of the set and the value of the performance parameter of the uncut cell.

16 Claims, 3 Drawing Sheets

(56) References Cited

U.S. PATENT DOCUMENTS

| | | |
|---|---|---|
| 2011/0208372 A1 | 8/2011 | Hansen et al. |
| 2013/0026839 A1* | 1/2013 | Grana .................. H02J 3/38 307/71 |
| 2016/0087132 A1* | 3/2016 | Alteneiji ................ H02S 50/00 438/59 |

OTHER PUBLICATIONS

French Preliminary Search Report (with English translation of Categories of Cited Documents) issued on Jan. 14, 2020 in French Application 1906688 filed on Jun. 20, 2019, 2 pages.

* cited by examiner

METHOD FOR ELECTRICALLY CHARACTERISING A CUT PHOTOVOLTAIC CELL

TECHNICAL FIELD AND PRIOR ART

The invention relates to the field of electrical characterization and measurement of the electric performance of photovoltaic sub-cells obtained by cutting a photovoltaic cell.

The use of photovoltaic sub-cells, that is, cut photovoltaic cells, makes it possible to improve the electric performance of photovoltaic modules that include photovoltaic sub-cells in comparison with photovoltaic modules made with whole photovoltaic cells, that is, uncut cells. In fact, cutting a photovoltaic cell into several sub-cells makes it possible, for a same light-receiving surface area, to reduce the current generated by the sub-cells in comparison with that generated by a same uncut cell. This lower current results in lower resistive losses in the interconnection strips used in photovoltaic modules, and therefore improves electrical conversion performance of the photovoltaic modules.

On the other hand, cutting photovoltaic cells to make sub-cells forms edges at the cutting lines that are not protected by the passivation layers present on the initial photovoltaic cell. Cutting can also damage the semiconductor located in proximity to the cutting lines and/or introduce impurities into the semiconductor (as is the case, for example, in laser cutting). These defects induce localised losses in the lifetime of the minority charge carriers generated in these cutting zones, resulting in current and voltage losses in proximity to the operating point of the sub-cells. This effect is particularly visible when cutting a heterojunction (HET) cell, which by nature has very few surface passivation defects and in which the creation of a few localised defects is sufficient to reduce the overall electric performance of the cell significantly.

Usually, photovoltaic cells are electrically characterised at the end of the production line in order to quantify their performance and sort them. The sorting step enables the creation of classes of cells with similar electric performance. These classes then make it possible to create photovoltaic modules with similar or close performance, and to avoid power losses at the photovoltaic modules that would be due to significant differences between electrical characteristics of the photovoltaic cells used in a same module. Indeed, if the cells in a same module have a distinct performance, the cells with poor individual performance can degrade the operation of the cells with good performance. This type of problem is avoided when all cells in a photovoltaic module have identical or close electric performance.

This also applies to photovoltaic modules made from photovoltaic sub-cells. The photovoltaic sub-cells are individually characterised to form classes of sub-cells and to make photovoltaic modules with sub-cells of a same class.

Photovoltaic cells with the same theoretical electric performance do not, in reality, have a homogeneous spatial distribution. There is therefore potentially a hidden disparity between photovoltaic cells of a same class. Because each photovoltaic cell is not perfectly homogeneous, the cutting step creates an additional disparity in the electrical characteristics of the resulting sub-cells, as parts of a same cell that have different performance are physically separated to form distinct sub-cells. This additional disparity is thus added to the already existing disparity between different whole, uncut cells.

Measuring the electrical characteristics of the photovoltaic sub-cells individually enables electric performance of the sub-cells to be quantified individually and sorted. On the other hand, measuring the electrical characteristics of the sub-cells individually does not make it possible to quantify and differentiate two effects related to the cutting of the cells, that is, additional disparity related to the inhomogeneity in the electric performance within each photovoltaic cell, and losses due to the degradation of the cells caused by the cell cutting method.

DISCLOSURE OF THE INVENTION

One purpose of the present invention is to provide a method for accurately quantifying impact of cutting on the electric performance of a photovoltaic cell, that is, quantifying the additional disparity related to the inhomogeneity in the electric performance within the photovoltaic cell and measuring performance losses due to the degradation of the photovoltaic cell generated by the cutting method, and also for correctly differentiating these two effects generated by cutting the photovoltaic cell into several photovoltaic sub-cells.

For this, a method for electrically characterising at least one cut photovoltaic cell is provided, including:
- a) measuring the I-V characteristic of the uncut photovoltaic cell;
- b) cutting the photovoltaic cell into several photovoltaic sub-cells; and
- c) measuring the I-V characteristic of each of the photovoltaic sub-cells not electrically connected to the other photovoltaic sub-cells;
- d) measuring the I-V characteristic of an assembly comprising all the photovoltaic sub-cells electrically connected to each other in parallel;
- e) determining, from the I-V characteristics measured, at least one electric performance parameter of the uncut photovoltaic cell, at least one electric performance parameter of each of the photovoltaic sub-cells and at least one electric performance parameter of the assembly comprising all the photovoltaic sub-cells electrically connected to each other in parallel;
- f) calculating, for each of the photovoltaic sub-cells, the difference between the value of the electric performance parameter of the photovoltaic sub-cell and the value of the electric performance parameter of the uncut photovoltaic cell;
- g) calculating the difference between the value of the electric performance parameter of the assembly comprising all the photovoltaic sub-cells electrically connected to each other in parallel and the value of the electric performance parameter of the uncut photovoltaic cell.

Step a) makes it possible to quantify initial performance of the whole photovoltaic cell, before cutting. Step c) makes it possible to quantify electric performance of the cut sub-cells individually. In step d), the electric performance of the assembly of reconnected sub-cells is quantified.

The I-V characteristics are measured at the output terminals of the uncut photovoltaic cell, of each of the photovoltaic sub-cells and of the assembly comprising all the photovoltaic sub-cells electrically connected to each other in parallel. During an I-V characteristic measurement, the current is measured at the output terminals and the charge is varied across the element whose I-V characteristic is measured.

The measurement performed in step d) makes it possible to measure the I-V characteristic of the assembly formed by all the photovoltaic sub-cells electrically connected to each other in parallel, in which the photovoltaic sub-cells are limited in the same way as when the photovoltaic cell is uncut. This measurement therefore provides direct access to the performance losses due to the degradation of the photovoltaic cell caused by the cutting method by performing the calculation in step g).

The measurement performed in step c) makes it possible to highlight disparity in the electric performance of the sub-cells and then evaluate their individual electric performance, which is not accessible if only step d) was performed. The calculation performed in step f) makes it possible to accurately quantify the additional disparity related to the inhomogeneity of the electric performance within the photovoltaic cell.

The measurement of performance losses due to the degradation of the cell caused by the cutting method is directly representative of the quality of the cutting method implemented. This method can therefore be implemented to ensure continuous monitoring of the cutting quality on a production line including cutting photovoltaic cells into photovoltaic sub-cells, without reducing throughput of the production line.

This method also has the advantage that it can be implemented with a minimum of electronic equipment required for the measurements, and using existing I-V characteristic measurement equipment with a minimum of modifications.

In step f), the electric performance parameter of each photovoltaic sub-cell and the electric performance parameter of the uncut photovoltaic cell used for the calculation are of the same nature (current, voltage, power, etc.).

In step g), the electric performance parameter of the assembly comprising all the photovoltaic sub-cells electrically connected to each other in parallel and the electric performance parameter of the uncut photovoltaic cell used for the calculation are of the same nature.

In steps f) and g), the absolute values of the calculated differences are taken into account to quantify impact of cutting on the electric performance of the cell.

The electric performance parameters used for the calculation of step f) may be of the same nature as those used for the calculation of step g).

Advantageously, the electric performance parameters used for the calculations of steps f) and g) may correspond to open circuit voltages. By choosing the open circuit voltage as the electric performance parameter, it is possible to have a parameter that is very representative of the performance losses generated by the cutting method and of the additional disparity related to the inhomogeneity in the electric performance within the photovoltaic cell.

In general, the electric performance parameters may correspond to one or more of the following parameters: short-circuit current $I_{SC}$ or short-circuit current density $J_{SC}$, open circuit voltage $V_{OC}$, form factor FF, maximum current Imax, maximum voltage Vmax, maximum power Pmax, conversion efficiency η, bifacial conversion efficiency (in which powers generated on both faces are taken into account). It is also possible to take account of electric performance parameters reflecting the course of the performance on both faces before and after cutting the photovoltaic cell.

Steps a), c) and d) may be implemented with at least:
a voltage and current measurement device;
contact elements disposed against metallizations present at the front and rear faces of the photovoltaic cell, each of the contact elements including several parts electrically insulated from each other and configured to be each connected to the voltage and current measurement device.

Thus, the same contact elements can be used for all the measurements of I-V characteristics in the method.

During steps a) and d), switches may be configured to electrically connect, for at least one of the contact elements, the parts of said contact element, and during step c), the switches may be configured to electrically insulate the parts of said contact element.

The switches may correspond to power transistors and/or be disposed within the contact elements.

The contact elements may include combs each provided with several groups of tips with, in each group of tips, tips for measuring voltage and tips for measuring current, and each part of one of the contact elements may comprise at least one of the groups of tips.

During steps a), c) and d), the tips of the combs may be contacted with metallizations of the type busbars, also called collecting bars, present at the front face and/or the rear face of the photovoltaic cell.

Alternatively, the contact elements may include wires that are contacted with the metallizations present at least at the front face of the photovoltaic cell. Such contact elements are adapted for photovoltaic cells that do not include busbars.

The contact elements may further include at least one electrically conductive element contacted with a metallization present on a rear face of the photovoltaic cell, wherein the electrically conductive element may include, during step c), several parts electrically insulated from each other.

Steps a), c) and d) may be implemented by illuminating the photovoltaic cell with a same light spectrum, with a same light power and at a same temperature.

Step b) may include the implementation of laser cutting and/or mechanical cleaving and/or cutting with a saw or diamond wire and/or water jet cutting.

Advantageously, during step c), the I-V characteristics of the photovoltaic sub-cells may be measured simultaneously, in parallel. When this method is implemented on a photovoltaic module production line, this enables the throughput of the production line not to be reduced. In this case, several measurement devices may be required for the implementation of this step c). Alternatively, it is possible to characterise each of the sub-cells successively, that is, to measure the I-V characteristics of the photovoltaic sub-cells successively one after the other.

The measurement equipment may be the same for each measurement performed, or it is possible to have several measurement equipment each dedicated to one or more of the measurement steps.

Alternatively, during step c), the I-V characteristics of the photovoltaic sub-cells may be measured successively by a same voltage and current measurement device, the measurement results being time multiplexed at the output of the measurement device.

BRIEF DESCRIPTION OF THE DRAWINGS

The present invention will be better understood upon reading the description of exemplary embodiments given purely by way of indication and in no way limiting purposes, with reference to the appended drawings in which.

Identical, similar or equivalent parts of the various figures described below bear the same reference numerals so as to facilitate switching from one figure to another.

The various parts shown in the figures are not necessarily drawn to a uniform scale, in order to make the figures more legible.

The various possibilities (alternatives and embodiments) should be understood as not being exclusive of each other and may be combined with each other.

DETAILED DISCLOSURE OF PARTICULAR EMBODIMENTS

Figure 1:
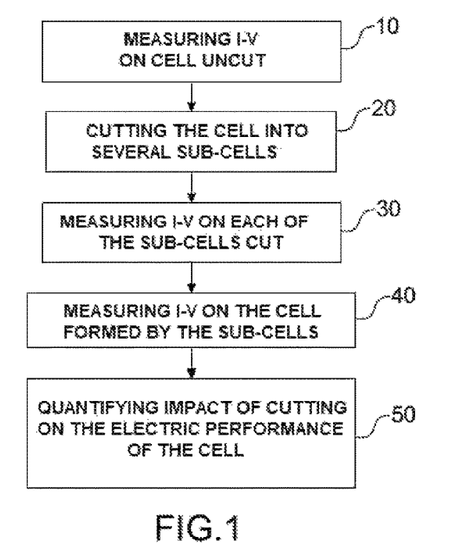
FIG. 1 shows, as a flow chart, a method for electrically characterising a cut photovoltaic cell, object of the present invention.

A method for electrically characterising a cut photovoltaic cell 102, enabling impact of cutting on the electric performance of the photovoltaic cell 102 to be quantified, is described below in connection with FIGS. 1 to 7. FIG. 1 shows, as a flow chart, the method steps that are implemented.

The cell 102 (shown in FIG. 2) corresponds for example to a HET cell. Alternatively, the cell 102 may be a perovskite, HET on perovskite tandem, Al-BSF (Aluminium Back Surface Field), PERC (Passivated Emitter and Rear Contact), PERT (Passivated Emitter and Rear Totally diffused), homojunction, III-V material, passivated contact cell, or any other type of photovoltaic cell that is compatible with cutting into several sub-cells. The cell 102 may be of any dimensions and shape, for example square or pseudo-square.

The cell 102 includes a front face 104 and a rear face 106. The cell 102 includes metallizations present on each of these faces 104, 106. In the example shown in FIG. 2, the metallizations present on the front face 104 of the cell 102 correspond to collection fingers (not shown in FIG. 2) on which busbars 108, which make it possible to collect the electric current generated by the cell 102 and which flow in the collection fingers, are disposed.

Figure 2:
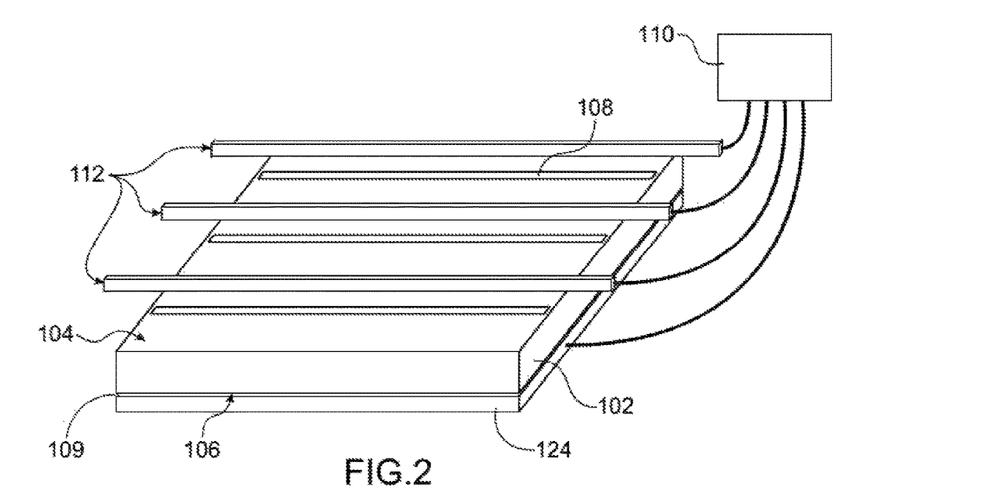
FIGS. 2 to 7 schematically show the photovoltaic cell during the implementation of different steps of the method for electrically characterising the photovoltaic cell, object of the present invention.

In the example visible in FIG. 2, the cell 102 includes three busbars 108 disposed on the front face 104. Alternatively, the cell 102 may include a different number of busbars 108 present on the front face 104.

The cell 102 also includes, at its rear face 106, a metallization 109 covering, for example, the entire rear face 106.

According to an alternative, the cell 102 may include, at its rear face 106 and instead of this metallization 109, collection fingers and busbars, for example similar to the busbars 108 present on the front face 104.

According to another alternative, the cell 102 may include, at the front face 104 and/or the rear face 106, metallizations which are different from those described above.

During a first step 10 of the method, a measurement of the I-V characteristic of the uncut cell 102 is implemented. This measurement is performed, for example, under standard test conditions, or STC, that is, by illuminating the cell 102 with a solar simulator emitting light having a normalised spectrum such as a 1000 W/m² AM1.5 solar spectrum, at a temperature of 25° C.

This I-V characteristic measurement is implemented by using:
- a voltage and current measurement device 110,
- contact elements 112, for example of the comb or grid type, and for example provided with groups of tips enabling 4-tip type measurements to be performed along each of the busbars 108, and
- a contact element 124 disposed against the back metallization 109.

The contact elements 112 and 124 are electrically connected to inputs of the voltage and current measurement device 110.

When measuring the I-V characteristic of the cell 102, the contact elements 112 are contacted with the busbars 108 and the contact element 124 is contacted with the metallization 109.

During this measurement of the I-V characteristic of the cell 102, the electric current generated by the cell 102 is measured for different voltage values across the cell 102. The measured I-V characteristic corresponds to a curve representing the current delivered by the cell 102 as a function of the value of the voltage across the cell 102.

Figure 3:
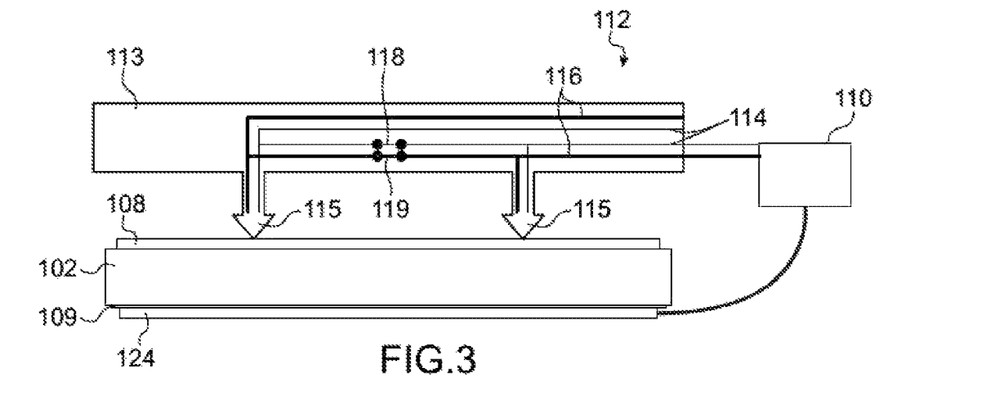

FIG. 3 shows a schematic cross-section view of the cell 102 and an exemplary embodiment of one of the contact elements 112 when in contact with one of the busbars 108 present on the front face of the cell 102, when measuring the I-V characteristic of the cell 102.

In the example described here, the contact elements 112 correspond to conductive combs 113 provided with groups of contact tips 115 that are physically contacted with the busbars 108 of the cell 102 upon measuring the I-V characteristic of the cell 102. Within a same group of contact tips 115, the wire to which the tips 115 of the contact elements 112 used for current measurement are connected is electrically insulated from the wire to which the tips 115 of the contact elements 112 used for voltage measurement are connected. In FIG. 3, two arrows represent two groups of contact tips 115.

Within each contact element 112, the tips 115 used for voltage measurements are electrically connected to each other by first electrical connections 114 which also serve to connect the voltage measurement tips to the voltage and current measurement device 110. The tips 115 used for current measurements are electrically connected to each other by second electrical connections 116 which also serve to connect the current measurement tips to the voltage and current measurement device 110. The first electrical connections 114 are distinct from the second electrical connections 116, and the first electrical connections 114 are not electrically connected to the second electrical connections 116.

Advantageously, in order that the contact elements 112 may be used both for measuring the I-V characteristic of the uncut cell 102 and for measuring the I-V characteristics of each of the sub-cells that will be obtained subsequently by cutting the cell 102, each of the contact elements 112 includes several parts electrically insulated from each other and configured to be each electrically connected to the voltage and current measurement device 110.

In each contact element 112, in order to be able to electrically connect or electrically insulate these parts to/from each other, the first electrical connections 114 of each contact element 112 include one or more switches 118 that enable, in the closed state, all the tips 115 of the contact element 112 serving for voltage measurement to be electrically connected to each other. Likewise, the second electrical connections 116 of each contact element 112 include one or more switches 119 which enable, in the closed state, all the tips 115 of the contact element 112 serving for current measurement to be electrically connected to each other. The switches 118, 119 correspond to power transistors, for example.

The number of switches 118 and 119 present in each contact element 112 is chosen as a function of the number of sub-cells to be characterized independently during the next steps of the method.

Alternatively, it is possible that the switches 118, 119 are not included in the contact elements 112, but are disposed outside the contact elements 112, for example within a connection device external to the contact elements 112. In this case, the first and second electrical connections 114, 116 are not directly connected to the measurement device 110, but are connected to the connection device, which is itself connected to the measurement device 110.

Since during this first step 10, the measured I-V characteristic is that of the whole, that is uncut, cell 102, the switches 118 and 119 are in the closed state so that in each of the contact elements 112, all of the voltage measurement tips 115 are electrically connected to each other so as to form only a single voltage measurement circuit measuring the voltage obtained over the whole length of each busbar 108 and all of the current measurement tips 115 are electrically connected so as to form a single current measurement circuit measuring the current delivered over the entire length of each busbar 108.

Figure 4:
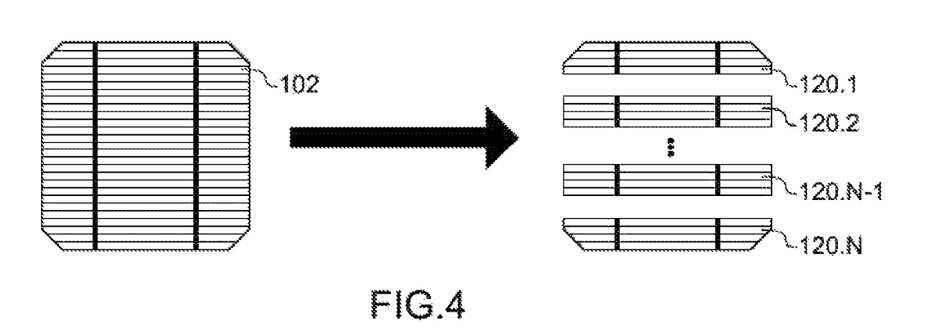

During a second step 20 of the method, the cell 102 is cut into several sub-cells 120. FIG. 4 schematically shows a number of sub-cells 120.1-120.N obtained as a result of cutting the cell 102. Preferably, the sub-cells 120 have identical or close dimensions and shapes in relation to each other.

The cutting technique(s) implemented may be of any type and are chosen especially as a function of the characteristics (materials, thickness, etc.) of the cell 102: laser cutting over the entire thickness of the cell 102, mechanical cleavage, laser cutting followed by mechanical cleavage, sawing, for example, with a diamond disk saw, diamond wire cutting, laser cutting followed by water jet cutting, etc.

The cell 102 is cut to form N sub-cells 120, with N being an integer greater than or equal to 2.

This cutting of the cell 102 splits each of the busbars 108 as well as the metallization 124 into several parts.

During a third step 30, a measurement of an I-V characteristic of each of the sub-cells 120 is implemented. The measurement of the I-V characteristic of each sub-cell 120 is implemented under the same illumination and measurement conditions as those with which the previous measurement of the I-V characteristic of the uncut cell 102 is implemented.

In the particular embodiment described herein, the contact elements 112 are used to measure the I-V characteristic of the uncut cell 102, and also to measure the I-V characteristics of the sub-cells 120. Prior to the measurements of the I-V characteristics of the sub-cells 120, the sub-cells 120 are therefore reassembled, that is, disposed side-by-side, to reconstitute an assembly having physically an identical or close geometry to that of the cell 102.

The switches 118, 119 are set to the open state so that, in each of the contact elements 112, the electrical connections 114, 116 and the voltage measurement and current measurement tips 115 form several independent measurement circuits, electrically insulated from each other, in order to measure, independently, the I-V characteristics of each of the sub-cells 120. In the example shown in FIG. 5, which corresponds to the case where the cell 102 is cut to form two sub-cells, or half-cells, 120.1, 120.2, opening the switches 118, 119 enables the first electrical connections 114 and the groups of voltage measurement tips 115 to form two independent voltage measurement circuits, electrically insulated from each other and including different tips from each other. The open state of the switches 118, 119 also enables the second electrical connections 116 and the groups of current measurement tips 115 to form two independent current measurement circuits, electrically insulated from each other and including different tips from each other. The tips of a first of the two voltage measurement circuits and a first of the two current measurement circuits are in contact with first parts 108.1 of the busbars 108 located on the first sub-cell 120.1, and the tips of a second of the two voltage measurement circuits and a second of the two current measurement circuits are in contact with second parts 108.2 of the busbars 108 located on the second sub-cell 120.2.

Likewise, with cutting of the cell 102, the contact element 124 used to contact the parts of the metallization 109 present on the rear face 106 of the sub-cells 120 is splitted into several distinct and electrically insulated parts from each other in order to perform the measurements of the I-V characteristics of the sub-cells 120 independently of each other. In the example shown in FIG. 5, the contact element 124 is splitted into two parts 124.1, 124.2 electrically insulated from each other, each being in contact with one of the parts 109.1, 109.2 of the metallization 109.

Figure 5:
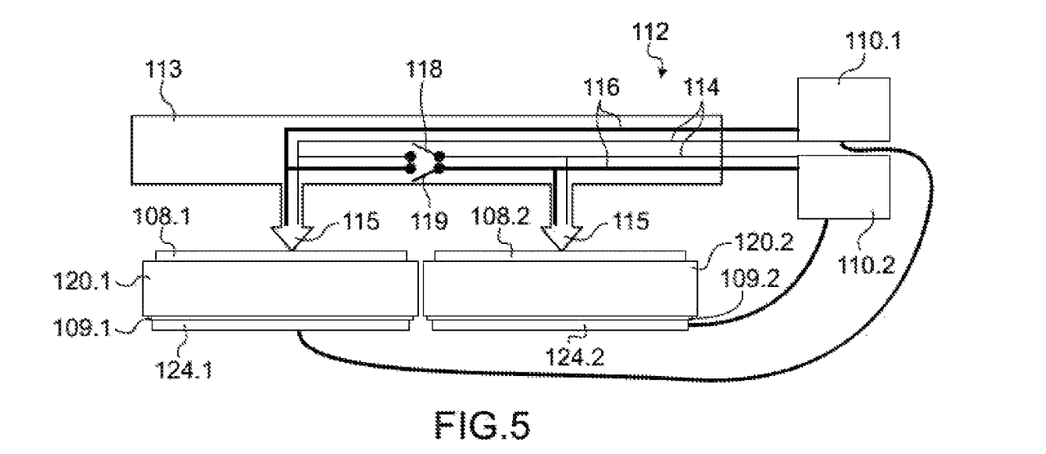

Measurements of the I-V characteristics of the sub-cells 120 may be performed simultaneously, in parallel, by using several measurement devices 110. In the example of FIG. 5, two measurement devices 110.1, 110.2 are present, each connected to one of the two current measurement circuits and one of the two voltage measurement circuits obtained by opening the switches 118, 119. In this case, the sub-cells 120 are illuminated simultaneously to perform measurements of the I-V characteristics of these sub-cells 120.

Alternatively, it is possible for the measurements of the I-V characteristics of the sub-cells 120 to be performed successively by using, for example, a single measurement device 110 which is then connected successively to the measurement circuits associated with each of the sub-cells 120. In this case, the sub-cells 120 may be illuminated successively to perform the measurements of the I-V characteristics of the sub-cells 120, the measurement results being able to be time multiplexed at the output of the measurement device 110. It is also possible that the measurements of the I-V characteristics of the sub-cells 120 are performed during a single illumination of the sub-cells 120.

The measured I-V characteristics of the sub-cells 120 correspond to curves each representing the current delivered by one of the sub-cells 120 as a function of the value of the voltage across this sub-cell 120.

Figure 6:
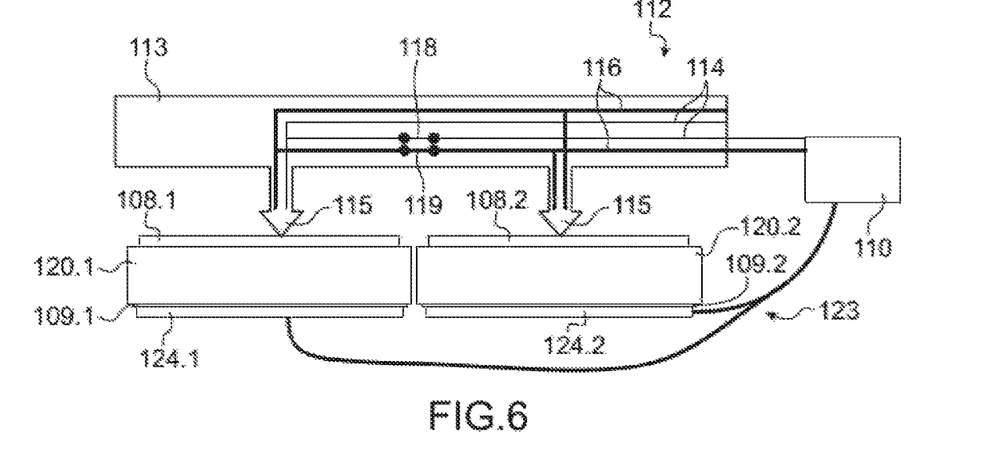

During a fourth step 40, the sub-cells 120 are electrically connected to each other in parallel to form an assembly 123 whose I-V characteristic is measured. These parallel electrical connections between the sub-cells 120 are here made by closing the switches 118, 119 and by electrically connecting to each other the divided parts 124.1, 124.2 of the contact element 124 used to contact the metallizations 109.1, 109.2 present on the rear face of the sub-cells 120. FIG. 6 schematically shows the configuration achieved during this step.

When the sub-cells 120 have been previously reassembled to reconstitute an assembly having physically the same geometry as that of the cell 102, the third and fourth steps 30 and 40 can be implemented successively, without interruption.

Alternatively, with time multiplexing, steps 30 and 40 may be implemented with one and the same illumination of the sub-cells 120 and with one and the same measurement device 110. In this case, under the same illumination, the I-V characteristic of each of the sub-cells 120 is measured individually (step 30), the measurement device 110 being connected alternately to each of the current-voltage measurement circuits of the sub-cells 120. The switches 118 and 119 are then closed to implement step 40.

The measurement of the I-V characteristic of the assembly 123 formed by electrically connecting in parallel the sub-cells 120 is implemented under the same illumination and measurement conditions as those with which the previous measurement of the I-V characteristic of the uncut cell 102 (step 10) and previous measurements of the I-V characteristics of the sub-cells 120 (step 30) are implemented.

During a step 50, impact of cutting on the electric performance of the cell 102 is quantified.

To quantify impact of cutting on the electric performance of the cell 102, performance parameters of the uncut photovoltaic cell 102, of each of the sub-cells 120 and of the assembly 123 comprising all the sub-cells 120 electrically connected to each other in parallel are determined from the previously measured I-V characteristics. For each of these I-V characteristics, one or more of the following parameters are for example determined or calculated: the short-circuit current $I_{SC}$ or short-circuit current density $J_{SC}$, open-circuit voltage $V_{OC}$, form factor FF, current $I_{max}$ and voltage $V_{max}$ enabling the maximum power $P_{max}$ delivered by the cell 102 to be obtained, conversion efficiency η.

These parameters are defined by the following equation:

$$\eta = \frac{P_{max}}{P_L} = \frac{V_{max} \cdot I_{max}}{P_L} = \frac{FF \cdot I_{SC} \cdot V_{OC}}{P_L}$$

with $P_L$ corresponding to the received light power, for example 1000W/m² under standard conditions.

The parameters $I_{SC}$, $V_{OC}$, $V_{max}$ and $I_{max}$ can be determined directly from the I-V characteristic curves.

Furthermore, the short circuit current density $J_{SC}$ corresponds to the short circuit current $I_{SC}$ normalised by the surface area of the cell 102, or of one of the sub-cells 120 or of the assembly 123 formed by the sub-cells 120 connected in parallel.

The additional disparity, created by the step of cutting the cell 102, is then quantified by calculating, for each of the sub-cells 120, the difference between the value of at least one electric performance parameter of the sub-cell 120 and the value of at least one electric performance parameter of the photovoltaic cell 102 uncut of the same nature as that considered for the photovoltaic sub-cell. For each sub-cell 120, the values of one or more performance parameters are therefore compared with that of the same parameter(s) determined for the whole cell 102. For the parameters that depend on the surface area considered ($I_{SC}$, $I_{max}$, $P_{max}$), it is the values normalised by the size of the cell that are compared.

The cutting losses are also quantified by calculating the difference between the value of at least one electric performance parameter of the assembly 123 comprising all the photovoltaic sub-cells electrically connected to each other in parallel and the value of at least one electric performance parameter of the photovoltaic cell 102 uncut of the same nature as that considered for said assembly 123.

The parameter(s) used to determine the additional disparity may or may not be similar to those used to evaluate losses associated with cutting of the cell 102. Advantageously, the additional disparity and cutting losses are calculated from the value of the open circuit voltage $V_{OC}$ determined for each of the previously measured I-V characteristics.

For the implementation of the method described above, the type of contact elements 112 used depends on the metallizations present on the front and rear face of the cell 102: combs provided with contact tips when the metallizations correspond to busbars, full plate contact (also called "chuck") for example made of copper or acquisition board PCB for a metallization formed by a single contact present on the rear face of the cell, electrically conductive wires when the metallizations correspond to collection fingers alone (without busbars), etc.

Figure 7:
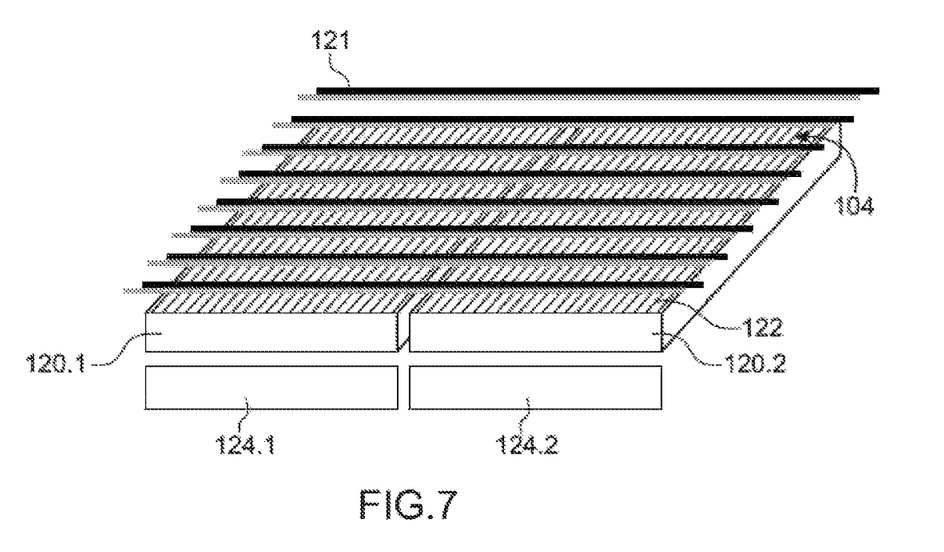

FIG. 7 shows a configuration in which metallizations present on the front face 104 of the cell 102, and therefore also on the front faces of the sub-cells 120, correspond to collection fingers 122 not covered with busbars. The contact elements correspond to wires 121 of electrically conductive material disposed on the front face 104, perpendicularly to the collection fingers 122, and printed circuit boards (PCB) type acquisition boards 124.1, 124.2 used on the rear face. The wires 121 used for current measurements are distinct from those used for voltage measurements. In addition, after the cell 102 has been cut, several groups of wires 121 are defined such that each group of wires is dedicated to measurements performed on one of the sub-cells 120.

The electrical characterization method previously described is advantageously implemented on a photovoltaic module production line using photovoltaic sub-cells. It is thus possible to monitor regularity of the impact of cutting of the cells on the performance of the sub-cells obtained, by following the course of the additional disparity brought about by cutting the cell into several sub-cells, and by following the course of losses generated by the cutting step.

The invention claimed is:

1. A method, comprising:
   (a) measuring, using a voltage and current measurement device, a current-voltage (I-V) characteristic of an uncut photovoltaic cell being illuminated with first light;
   (b) cutting the uncut photovoltaic cell into a plurality of photovoltaic sub-cells;
   (c) measuring, using the voltage and current measurement device, an I-V characteristic of each of the plurality of photovoltaic sub-cells, which are not electrically connected to each other and are illuminated with second light;
   (d) measuring, using the voltage and current measurement device, an I-V characteristic of an assembly comprising all the plurality of photovoltaic sub-cells electrically connected to each other in parallel and being illuminated with third light;
   (e) determining, from the I-V characteristics measured in steps (a), (c), and (d), an electric performance parameter of the uncut photovoltaic cell, an electric performance parameter of each of the plurality of photovoltaic sub-cells, and an electric performance parameter of the assembly;
   (f) calculating, for each photovoltaic sub-cell of the plurality of photovoltaic sub-cells, a difference between a value of the electric performance parameter of the photovoltaic sub-cell and a value of the electric performance parameter of the uncut photovoltaic cell; and
   (g) calculating a difference between the value of the electric performance parameter of the assembly and the value of the electric performance parameter of the uncut photovoltaic cell to quantify an impact that the cutting of the uncut photovoltaic cell has on electric performance, the impact including losses due to degradation of the plurality of photovoltaic sub-cells caused by the cutting.

2. The method according to claim 1, wherein the electric performance parameters used for calculating in step (f) of a same type as those used for the calculating in step (g).

3. The method according to claim 1, wherein the electric performance parameters used for the calculating in steps (f) and (g) correspond to open circuit voltages.

4. The method according to claim 1, wherein step (a) is implemented with at least contact elements disposed against metallizations present at front and rear faces of the uncut photovoltaic cell, each of the contact elements including a plurality of parts electrically insulated from each other and configured to be each connected to the voltage and current measurement device.

5. The method according to claim 4, wherein during step (a), switches are configured to electrically connect, for at least one of the contact elements, the plurality of parts of said contact element, and during step (c), the switches are configured to electrically insulate the plurality of parts of said contact element.

6. The method according to claim 5, wherein the switches correspond to power transistors and/or are disposed within the contact elements.

7. The method according to claim 4, wherein the contact elements include combs each provided with a plurality of groups of tips with, in each group of the tips, tips for measuring voltage and tips for measuring current, and wherein each part of one of the contact elements comprises at least one of the plurality of groups of tips.

8. The method according to claim 7, wherein during step (a), the tips of the combs are contacted with busbar-type metallizations present at the front face and/or the rear face of the photovoltaic cell.

9. The method according to claim 4, wherein the contact elements include wires, which are contacted with the metallizations present at least at the front face of the photovoltaic cell.

10. The method according to claim 4, wherein the contact elements further include at least one electrically conductive element, which is contacted with at least one metallization present on a rear face of the uncut photovoltaic cell.

11. The method according to claim 1, wherein the first light, the second light, and the third light have a same light spectrum, with a same light power and at a same temperature.

12. The method according to claim 1, wherein step (b) includes implementing laser cutting and/or mechanical cleaving and/or cutting with a saw or diamond wire and/or water jet cutting.

13. The method according to claim 1, wherein during step (c), the I-V characteristics of the plurality of photovoltaic sub-cells are measured simultaneously.

14. The method according to claim 1, wherein during step (c), the I-V characteristics of the plurality of photovoltaic sub-cells are measured successively by the voltage and current measurement device, and measurement results are time multiplexed at an output of the voltage and current measurement device.

15. The method according to claim 1, wherein step (a) is implemented with at least contact elements disposed against metallizations present at front and rear faces of the plurality of photovoltaic sub-cells, each of the contact elements including a plurality of parts electrically insulated from each other and configured to be each connected to the voltage and current measurement device.

16. The method according to claim 1, wherein step (a) is implemented with at least contact elements disposed against metallizations present at front and rear faces of the plurality of photovoltaic sub-cells connected to each other in the assembly, each of the contact elements including a plurality of parts electrically insulated from each other and configured to be each connected to the voltage and current measurement device.

* * * * *